(No Model.)

F. G. HOBART.
FRICTION CLUTCH.

No. 561,940.

2 Sheets—Sheet 1.

Patented June 9, 1896.

Witnesses
John W. Adams
Clinton Hamlin

Inventor:—
Frank G. Hobart
by Dayton Pooler Brown
his Att'ys.

(No Model.) 2 Sheets—Sheet 2.
F. G. HOBART.
FRICTION CLUTCH.
No. 561,940. Patented June 9, 1896.
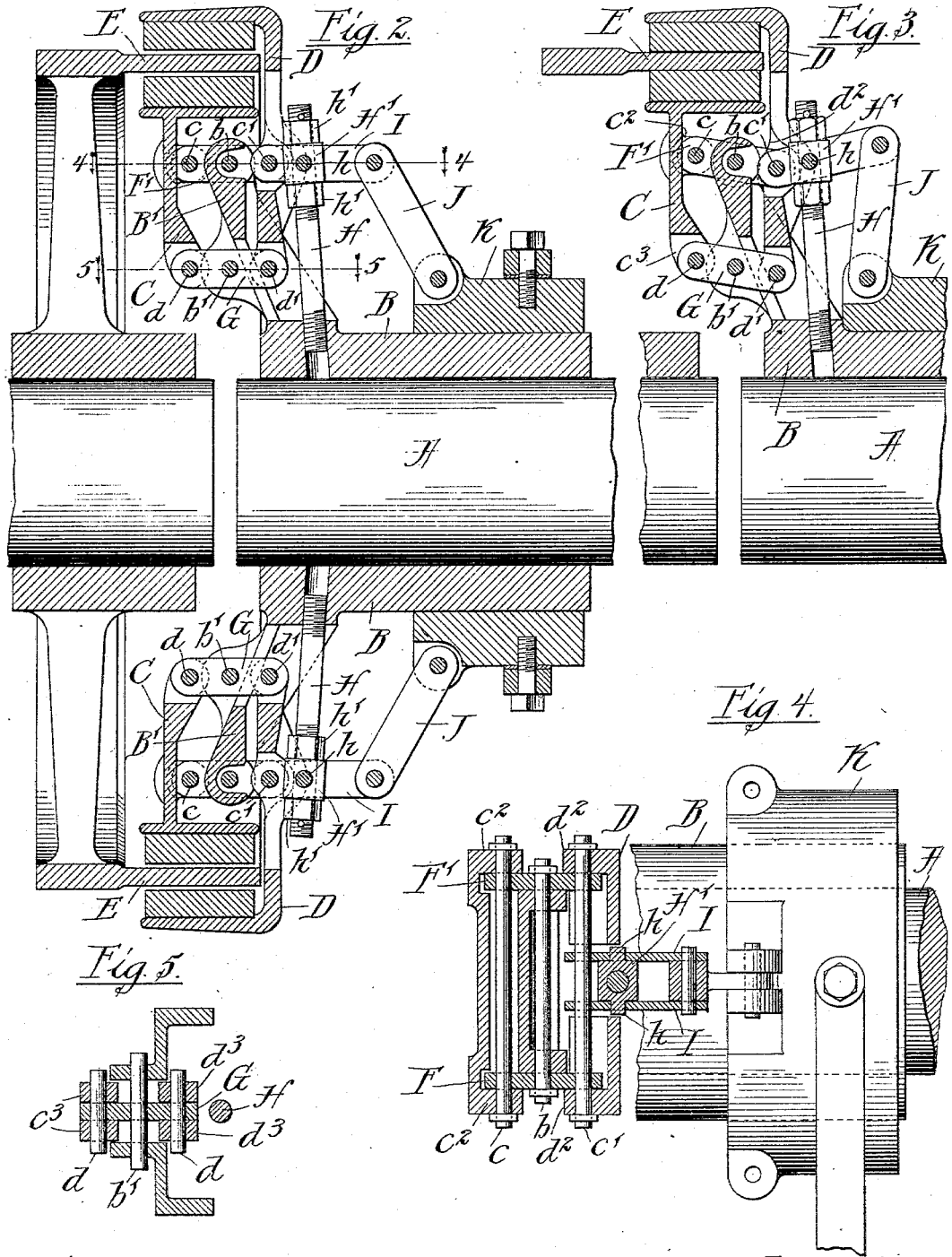
Witnesses:
John W. Adams
Clinton Hamlink
Inventor:
Frank G. Hobart
by Dayton, Poole & Brown
his Attys

UNITED STATES PATENT OFFICE.

FRANK G. HOBART, OF BELOIT, WISCONSIN, ASSIGNOR TO THE FAIRBANKS, MORSE & COMPANY, OF CHICAGO, ILLINOIS.

FRICTION-CLUTCH.

SPECIFICATION forming part of Letters Patent No. 561,940, dated June 9, 1896.

Application filed May 15, 1895. Serial No. 549,341. (No model.)

*To all whom it may concern:*

Be it known that I, FRANK G. HOBART, of Beloit, in the county of Rock and State of Wisconsin, have invented certain new and useful Improvements in Friction-Clutches; and I do hereby declare that the following is a full, clear, and exact description thereof, reference being had to the accompanying drawings, and to the letters of reference marked thereon, which form a part of this specification.

This invention appertains to improvements in friction-clutches, and relates more specifically to improvements in that class of friction-clutches in which a pair of movably-supported clutch members are simultaneously moved in radial paths toward or from an interposed annular part or flange for the purpose of engaging or releasing the latter.

The object of the invention is to provide an improved construction in devices of the character above referred to; and the invention consists in the matters hereinafter referred to, and more particularly pointed out in the appended claims.

The invention will be more readily understood by reference to the accompanying drawings, in which—

Figure 1:
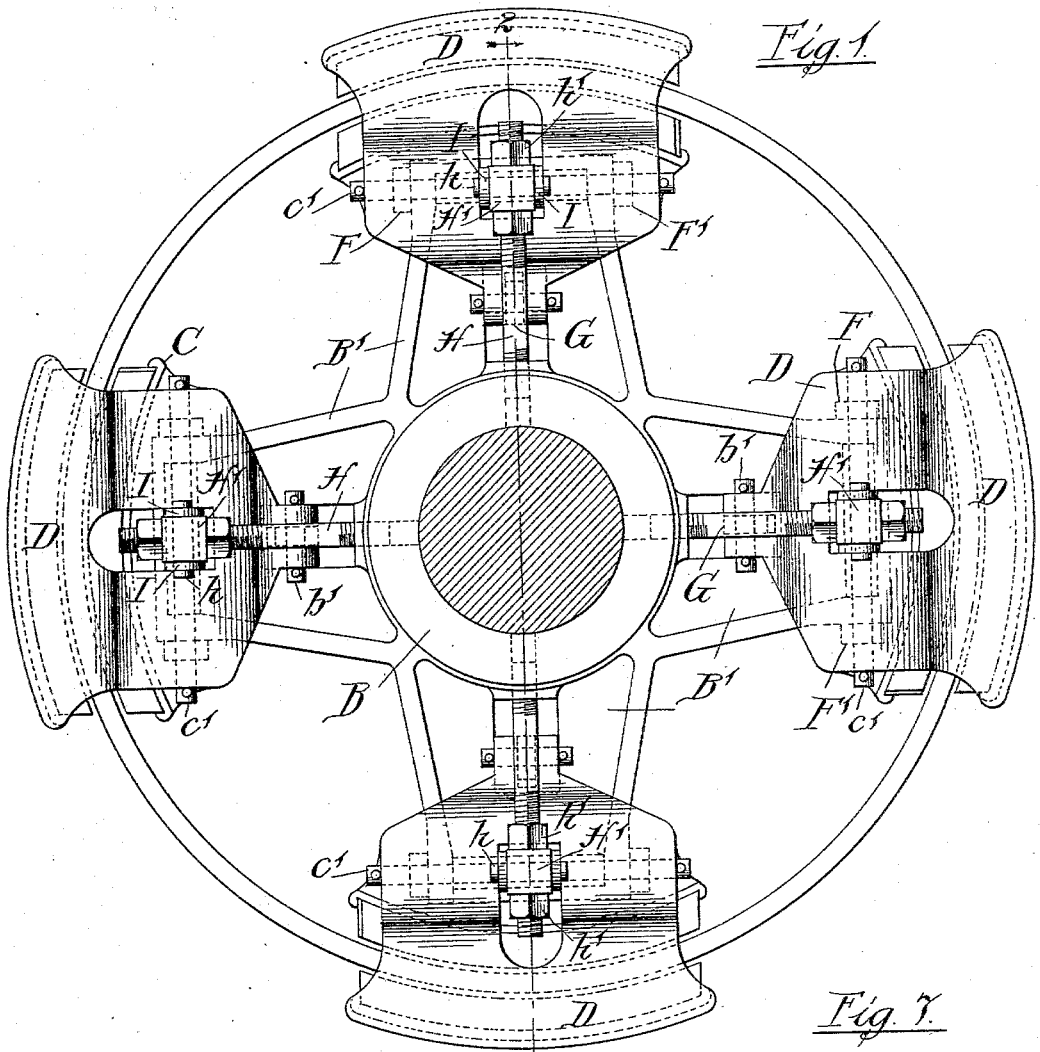
Figure 6:
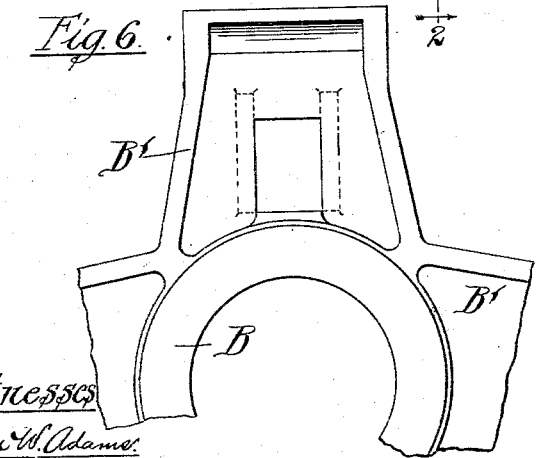
Figure 7:
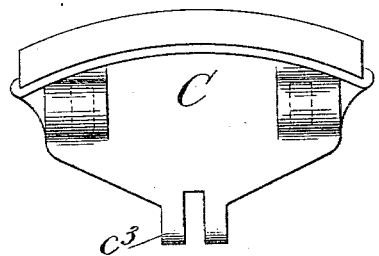

Figure 1 is an end view of a shaft provided with a plurality of radial clutch-arms, each equipped with my invention. Fig. 2 is an axial section of the same, taken on line 2 2 of Fig. 1. Fig. 3 is a fragmentary view similar to Fig. 2, showing the parts in changed position. Fig. 4 is a horizontal section taken on line 4 4 of Fig. 2, showing the shaft in plan view. Fig. 5 is a similar section taken on line 5 5 of said Fig. 2. Fig. 6 is a detail face view of the clutch-arms with the clutch members removed. Fig. 7 is an inner face view of one of the inner clutch members.

Referring to said drawings, A designates a shaft, upon which is rigidly mounted a hub B, provided with one or more radial arms or shoe-supports B'. Each of said arms carries an inner and outer clutch member or shoe C and D, which are adapted to be brought into frictional engagement with an interposed flange or part E, forming a part of the member which is to be driven or held by the clutch.

The particular construction of the arm B' is not essential; but it is herein shown as being relatively wide in a direction circumferentially of the shaft and as being integrally or otherwise united with the hub B and inclined from a perpendicular, so as to extend at its outer end beneath the flange E, as clearly seen in Fig. 2. The clutch members C and D, forming each pair, are supported in such manner as to be movable radially on the clutch-arms by means of a system of parallel levers, which are pivoted to the arms between their ends and which serve to support the clutch members parallel with each other. In the particular construction shown each pair of clutch members is carried or supported by means of three levers F, F', and G, to the ends of which the clutch members are connected by means of pivot-pins $c\ c'$ and $d\ d'$. Said pins extend transversely through the ends of said levers and through lugs $c^2\ c^2\ c^3$ and $d^2\ d^2\ d^3$, formed on the inner or proximate faces of the clutch members. The levers F, F', and G are in turn pivotally mounted upon the arm B' by means of pivot-pins $b\ b'$, which extend transversely through the central parts of said levers and through suitable bearing-apertures formed in the arm B'.

The pins $c\ c'$, $d\ d'$, and $b\ b'$ are all arranged parallel with each other, and when the clutch members are thus mounted and connected it will be obvious that any movement of either one of said members will cause a corresponding movement of the other of said members in an inverse direction, or, in other words, said members will be caused to simultaneously approach or recede from the flange.

Another and equally important result arising from the construction described is that the clutch members will in their outward and inward movement be positively retained in the same parallel relation with each other— *i. e.*, they will approach each other in parallel lines—so that the frictional contact of the shoes will be uniform throughout their entire width of engagement with the flange. This is an important feature, as by reason of this construction all guides or lateral supports of the kind heretofore commonly employed to insure the proper approach of the clutch members to the driven member are dispensed with, while at the same time a more perfect parallelism is insured than it is practicable to obtain by the use of such guides.

Means for imparting the necessary movement to the clutch members may obviously be provided in any one of a number of different ways; but a simple and preferred construction for accomplishing this end is herein shown, which is as follows: H designates a fulcrum stud or support extending radially outward from the main shaft immediately in rear of the center of the pair of clutch members. Upon the upper end of this stud is mounted a vertically-adjustable collar H', provided with oppositely-projecting pivot studs or trunnions h h, upon which are mounted a pair of levers I I. The levers I have pivotal engagement at their front ends with the pin c' of the outer clutch member, while a link J is pivotally connected at one of its ends between the opposite or near ends of the two levers I. The link J is connected with and actuated by a sleeve K, adapted to slide endwise upon the main shaft in a familiar manner.

Means for adjusting the collar or fulcrum-support H' upon the stud H are provided as follows: Said collar is mounted to slide upon the stud, and the latter is screw-threaded and is provided with adjusting-nuts h' h' above and below the collar.

The operation of the device is obvious. The sliding sleeve K, being at its position remote from the clutch and the parts in the position shown in Fig. 2, a movement of the sleeve toward the clutch acts through the medium of the link J to throw radially outward the outer end of the levers I I and to correspondingly throw radially inward their ends engaging the pin c'. The inward movement of the front ends of the lever I carries the outer clutch member into engagement with the flange E, and at the same time, through the medium of the oscillating levers connecting the clutch members, carries the inner clutch member C in the reverse direction or radially outward into engagement with the inner surface of the flange E.

I claim as my invention—

1. In a friction-clutch the combination with a clutch-support of a pair of clutch members and levers for supporting the clutch members, arranged at different distances radially from the shaft-axis, and having pivotal connection with the clutch-supports at points between their points of connection with the clutch members, substantially as described.

2. In a friction-clutch, the combination with a main shaft, a clutch-supporting arm extending radially from said shaft, two pivot-pins mounted on said arm at different distances radially from the axis of the main shaft; said pivot-pins being arranged at right angles to the arm and to the axis of the main shaft, a plurality of oscillatory levers pivoted between their ends upon said pivot-pins, clutch members mounted upon the opposite ends of said levers, each member having pivotal connection with both the outer and inner levers, whereby a movement of either member in either direction will cause a reverse movement of the other member, and means for actuating said clutch members, substantially as set forth.

3. In a friction-clutch, the combination with a main shaft and a clutch-support of a pair of clutch members and levers for supporting the clutch members, arranged at different distances radially from the shaft-axis and having pivotal connection with the clutch-supports at points between the clutch members, and means for actuating the clutch members, comprising a radially-extending fulcrum-stud, an oscillatory lever mounted on said stud, pivotally connected at one end with one of the clutch members, a sliding sleeve on the main shaft, and a toggle-link connecting said sleeve with the said oscillatory lever, substantially as described.

4. In a friction-clutch, the combination with a main shaft, a clutch-supporting arm extending radially from said shaft, two pivot-pins mounted on said arm at different distances radially from the axis of the main shaft; said pivot-pins being arranged at right angles to the arm and to the axis of the main shaft, a plurality of oscillatory levers pivoted between their ends upon said pivot-pins, clutch members mounted upon the opposite ends of said levers, each member having pivotal connection with both the outer and inner levers, whereby a movement of either member in either direction will cause a reverse movement of the other member, and means for actuating said clutch members, comprising a radially-extending fulcrum-stud, a block provided with trunnions, adapted to slide on said stud, nuts on the fulcrum-stud at opposite sides of said block, levers pivotally engaged with said trunnions, said levers being connected with one of the clutch members, a sliding sleeve on the shaft, and a toggle-link connecting the sleeve with said levers last mentioned, substantially as described.

In testimony that I claim the foregoing as my invention I affix my signature, in presence of two witnesses, this 1st day of May, A. D. 1895.

FRANK G. HOBART.

Witnesses:
C. D. HARRIS,
J. B. DOW.